United States Patent Office 3,284,469
Patented Nov. 8, 1966

3,284,469
SUBSTITUTED PHTHALANS
Fred Keller, Northridge, Calif., assignor to Rexall Drug
and Chemical Company, Los Angeles, Calif., a corporation of Delaware
No Drawing. Filed May 24, 1965, Ser. No. 458,475
12 Claims. (Cl. 260—332.3)

This application is a continuation-in-part of my application entitled "Substituted 1,1-Diphenylphthalans," Serial No. 405,613 filed October 21, 1964, now abandoned.

This invention relates to compositions of matter classified in the art of chemistry as substituted phthalans.

The invention sought to be patented is described as residing in the concept of a chemical compound having a molecular structure in which the phthalan nucleus bears on the carbon atom at the 1-position a di-lower alkylamino-lower alkyl radical, and the hereinafter disclosed equivalents thereof.

As used throughout this application, the term "lower alkyl" embraces both straight and branched chain alkyl radicals containing from 1 to 6 carbon atoms, for example, methyl, ethyl propyl, isopropyl, n-butyl, tert-butyl, amyl, sec-amyl, n-hexyl, 2-ethylbutyl, 2,3-dimethylbutyl and the like; the term "lower alkoxy" embraces both straight and branched chain alkoxy radicals containing 1 to 6 carbon atoms, for example, methoxy, ethoxy, propoxy, isopropoxy, n-butoxy, tert-butoxy, n-amyloxy, n-hexyloxy, 2-ethylbutoxy, 2,3-dimethylbutoxy and the like; and the term "halo" embraces chloro, bromo, fluoro and iodo.

The tangible embodiments of this invention possess the inherent general physical characteristics of being, in the form of their acid addition salts, solid crystalline materials. Nuclear magnetic resonance (NMR) data and elemental analysis, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity as antipyretic, antiinflammatory, diuretic and analgesic agents as determined by recognized and accepted pharmacological test procedures.

The manner and process of making and using the invention will now be generally described so as to enable a person skilled in the art of chemistry to make and use the same as follows:

The reaction sequence leading to the substituted phthalans of this invention is set forth as follows:

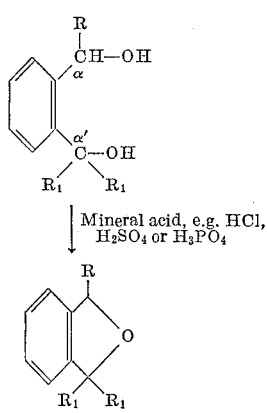

wherein R is di-lower alkylamino-lower alkyl and its hereinafter described equivalents and $R_1$ is hydrogen or its hereinafter described equivalents.

The starting materials in the above reaction sequence are o-xylene-$\alpha,\alpha'$-diols which are described and claimed in my application entitled "Substituted Xylenediols," filed concurrently herewith, and are conveniently prepared as described therein by treatment of compounds of the formula

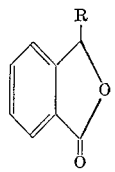

where R is as described above, with lithium aluminum hydride, or other alkali metal aluminohydride, to prepare starting materials where $R_1$ is hydrogen, or with a reagent of the formula $R_1$—Mg—Br or $R_1$—Li where $R_1$ is a substituent other than hydrogen as described hereinafter.

In the preparation of tangible embodiments of this invention where $R_1$ is hydrogen, the starting material is treated with a mineral acid such as hydrochloric, sulfuric or phosphoric acid to form the corresponding acid addition salt which, in turn, is heated in the presence of p-toluenesulfonic acid as a melt.

It has been found that treatment of starting materials where $R_1$ is an organic radical of the alkyl, aryl, aralkyl or heterocyclic series such as lower alkyl, phenyl, phenyl-lower alkyl, thienyl and phenyl and phenyl-lower alkyl substituted with one or more lower alkyl, lower alkoxy, halo or trifluoro-methyl radicals, with a mineral acid results in the preparation of final products having corresponding $R_1$ substitution which have the same utility as the final products where $R_1$ is hydrogen and are their full equivalents. The reaction readily proceeds to completion at a temperature of 0° C. to room temperature and the product is isolated by conventional techniques.

Starting materials in which the di-lower alkylamino radical (R) is replaced by an amino or mono-lower alkyl-amino radical or by a heterocyclic ring linked to the lower alkyl group attached to the $\alpha$-carbon atom of the nucleus through a nitrogen atom, such as piperidino, pyrrolidino, morpholino, piperazino and the like and/or starting materials having one or more lower alkyl, lower alkoxy trifluoromethyl or halo radicals on the benzene ring are the full equivalents of the specific starting materials illustrated in the above reaction sequence in the reaction with a mineral acid thereby to produce similarly substituted phthalan final products having the same utility as the specific substituted phthalans depicted hereinabove. Such equivalent starting materials are readily prepared by the reaction of appropriately substituted di-lower alkylaminophthalidyl-alkanes as depicted hereinabove, and are described in my aforementioned application entitled "Substituted Xylenediols," filed concurrently herewith.

The tangible embodiments of this invention can, if desired, be converted into nontoxic pharmaceutically acceptable acid addition and quaternary ammonium salts. Salts which can be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially with hydroxy organic acids and polybasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid addition and quaternary ammonium salts are the full equivalents of the bases from which they are derived and are included within the scope of this invention.

The tangible embodiments of this invention, either as free bases or in the form of a nontoxic pharmaceutically acceptable acid addition or quaternary ammonium salt, can be combined with conventional pharmaceutical diluents and carriers to form such dosage forms as tablets, suspensions, solutions, suppositories and the like.

The best mode contemplated by the inventor for carrying out the invention will now be set forth as follows:

EXAMPLE 1

*1-(1-dimethylaminopropyl)phthalan*

α-(1-dimethylaminopropyl)-o-xylene-α,α'-diol (11.0 g., 0.042 mole) in the form of its hydrochloride salt is heated at 180° C. for 30 minutes in the presence of an excess of p-toluenesulfonic acid (11 g.). The resulting melt is worked up to give a light-colored free base (6.0 g., 70%) that is converted to the picrate salt for analysis.

*Analysis.*—Calculated for $C_{19}H_{22}N_4O_8$: C, 52.53%; H, 5.10%; N, 12.89%; O, 29.46%. Found: C, 52.26%; H, 4.89%; N, 13.03%; O, 29.44%.

The following examples illustrate the preparation of other tangible embodiments of this invention:

EXAMPLE 2

*1-dimethylaminomethyl-3,3-diphenylphthalan*

α-Dimethylaminomethyl - α',α'-diphenyl-o-xylene-α,α'-diol (1.0 g., 0.0027 mole) is dissolved in methanol (20 ml.) and with cooling is treated with sulfuric acid (2.0 g.). The solution is allowed to stand at room temperature for 15 minutes and ether is added resulting in separation of the product as the sulfate salt. The salt is triturated with water, filtered and washed with cold water. Yield is 530 mg. (53%). Basification and crystallization from ethanol/water gives colorless needles of the product in free base form, M.P. 98°–99.5° C.

*Analysis.*—Calculated for $C_{23}H_{23}NO$: C, 83.85%; H, 7.04%; N, 4.25%. Found: C, 83.95%; H, 6.85%; N, 4.30%.

EXAMPLE 3

*1-(1-dimethylaminopropyl)-3,3-diphenylphthalan*

α-(1-dimethylaminopropyl)-α',α'-diphenyl - o - xylene-α,α'-diol (10 g.) is added to sulfuric acid (25 ml.) with stirring. After standing 2 hours at room temperature, water (200 ml.) is added to stop the reaction. The sulfate salt is recovered by filtration, converted to the free base (7.3 g., 80%) and recrystallized from acetonitrile to give 6.2 g. of product, 98°–100° C.

*Analysis.*—Calculated for $C_{25}H_{27}NO$: C, 84.04%; H, 7.55%; N, 3.91%. Found: C, 83.73%; H, 7.68%; N, 4.03%.

EXAMPLE 4

*1-dimethylaminomethyl-3,3-di-(o-tolyl)phthalan*

α-Dimethylaminomethyl-α',α'-di-(2 - methylphenyl)-o-xylene-α,α'-diol (9.5 g.) is converted by treatment in tetrahydrofuran with gaseous hydrogen chloride. The gummy solid resulting is crystallized from acetonitrile to yield 5.6 g. (56%) of product in the form of the hydrochloride salt, M.P. 250°–252° C.

*Analysis.*—Calculated for $C_{25}H_{28}NOCl$: C, 76.21%; H, 7.16%; N, 3.55%; Cl, 8.99%. Found: C, 75.73%; H, 7.19%; N, 4.07%; Cl, 8.81%.

EXAMPLE 5

*1-dimethylaminomethyl-3,3-di-(p-tolyl)phthalan*

By the same procedure described in Example 4, α-dimethylaminomethyl-α',α'-di-(4 - methylphenyl)-o-xylene-α,α'-diol is converted by treatment with gaseous hydrogen chloride to yield 33 g. (84%) of product that is recrystallized from acetonitrile to give crystals, M.P. 208° C.–211° C.

*Analysis.*—Calculated for $C_{25}H_{27}NO \cdot HCl \cdot \frac{1}{2}H_2O$: C, 74.70%; H, 7.27%; N, 3.40%; Cl, 8.57%. Found: C, 73.89%; H, 7.24%; N, 3.55%; Cl, 9.16%.

EXAMPLE 6

*1-dimethylaminomethyl-3,3-di-(o-anisyl)phthalan*

By the same procedure described in Example 4, α-dimethylaminomethyl-α',α'-di-(2-methoxyphenyl)-o-xylene-α,α'-diol (7.5 g., 0.017 mole) in tetrahydrofuran is treated with an excess of hydrogen chloride gas to form 6.1 g. (82%) of the hydrochloride salt, M.P. 235°–237° C. which is recrystallized from acetonitrile.

*Analysis.*—Calculated for $C_{25}H_{28}NO_3Cl$: C, 70.49%; H, 6.62%; N, 3.28%; Cl, 8.32%. Found: C, 70.57%; H, 6.61%; N, 3.77%; Cl, 8.84%.

EXAMPLE 7

*1-dimethylaminomethyl-3,3-di-(p-chlorophenyl)phthalan*

The oxalate salt of α-dimethylaminomethyl-α',α'-di-(4-chlorophenyl)-o-xylene-α,α'-diol (5.7 g.) is dissolved in sulfuric acid (15 ml.) at room temperature. After standing at room temperature for 30 minutes, the gradual addition of water to the cooled solution causes precipitation of the bisulfate salt which is recrystallized from acetonitrile in a yield of 4 g., M.P. 213°–216° C.

*Analysis.*—Calculated for $C_{23}H_{23}NO_5Cl_2S \cdot H_2O$: C, 53.69%; H, 4.89%; N, 2.72%; Cl, 13.78%. Found: C, 53.56%; H, 4.79; N, 2.80%; Cl, 13.32%.

EXAMPLE 8

*1-dimethylaminomethyl-3,3-di-(2-thienyl)phthalan*

α-Dimethylaminomethyl-α',α' - di - (2 - thienyl) - o-xylene-α,α'-diol (9 g., 0.025 mole) is treated an excess of gaseous hydrogen chloride in tetrahydrofuran as described in Example 6 to yield, after recrystallization from isopropyl alcohol, 8 g. (85%) of the phthalan, M.P. 224°–227° C.

*Analysis.*—Calculated for $C_{19}H_{20}NOS_2Cl$: C, 60.37%; H, 5.33%; N, 3.70%; S, 16.96%; Cl, 9.38%. Found: C, 60.31%; H, 5.02%; N, 3.94%; S, 16.49%; Cl, 9.12%.

EXAMPLE 9

*1-(1-dimethylaminopropyl)-3,3-di-(2-thienyl)phthalan hydrochloride*

Using the same method described in Example 8, α-(1-dimethylaminopropyl)-α',α'-di - (2-thienyl) - o - xylene-α,α'-diol (2 g.) is converted to 1.4 g. (67%) of the phthalan hydrochloride.

*Analysis.*—Calculated for $C_{21}H_{24}NOS_2Cl$: C, 62.12%; H, 5.95%; O, 3.94%; N, 3.45%; S, 15.79%. Found: C, 61.70%; H, 6.05%; O, 4.49%; N, 3.53%; S, 15.02%.

EXAMPLE 10

*1-(1-aminopropyl)-3,3-diphenylphthalan*

4.0 grams α-(1-aminopropyl)-α',α'-diphenyl-o-xylene-α,α'-diol is stirred with ether saturated with hydrogen chloride. An oil separates from the solution and, after decanting the ether, the product is crystallized from acetonitrile and then recrystallized from methanol-ether as the hydrochloride salt in a yield of 5.0 g., M.P. 257°–259° C. decomp.

*Analysis.*—Calculated for $C_{23}H_{24}ONCl$: C, 75.40%; H, 6.55%; N, 3.82%; Cl, 9.70%. Found: C, 75.15%; H, 6.73%; N, 4.11%; Cl, 9.61%.

EXAMPLE 11

*1-dimethylaminomethyl-3,3-di(m-trifluoromethylphenyl) phthalan*

α - Dimethylaminomethyl - α',α' - di - (m - trifluoromethylphenyl)-o-xylene-α,α'-diol is dissolved in dry ether and then hydrogen chloride gas is passed through the solution to excess. Water is added to the oily product in ether and the product is obtained at a 40% yield as the hydrochloride salt, M.P. 140–145° C.

*Analysis.*—Calculated for $C_{25}T_{23}O_2NF_6 \cdot HCl \cdot 2H_2O$: C, 56.33%; H, 4.79%; N, 2.69%; Cl, 6.53%. Found: C, 55.87%; H, 4.84%; N, 2.60%; Cl, 6.61%.

The subject matter which the applicant regards as his invention is particularly pointed out and distinctly claimed as follows:

1. 1-(di-lower alkylamino-lower alkyl)phthalan.
2. 1-(1-dimethylaminopropyl)phthalan.
3. 1-dimethylaminomethyl-3,3-diphenylphthalan.
4. 1-(1-dimethylaminopropyl)-3,3-diphenylphthalan.
5. 1-dimethylaminomethyl-3,3-di-(o-tolyl)phthalan.
6. 1-dimethylaminomethyl-3,3-di-(p-tolyl)phthalan.
7. 1-dimethylaminomethyl-3,3-di-(o-anisyl)phthalan.
8. 1-dimethylaminomethyl - 3,3 - di - (p - chlorophenyl) phthalan.
9. 1 - dimethylaminomethyl - 3,3 - di - (2 - thienyl) phthalan.
10. 1 - (1-dimethylaminopropyl) - 3,3 - di - (2-thienyl) phthalan.
11. 1-(1-aminopropyl)-3,3-diphenylphthalan.
12. 1-dimethylaminomethyl - 3,3 - di - (m - trifluoromethylphenyl)phthalan.

No references cited.

WALTER MODANCE, *Primary Examiner.*

JAMES A. PATTEN, *Assistant Examiner.*